Aug. 26, 1924.  
T. B. LAMB  
1,506,067
ILLUSTRATED STORY DISPLAY DEVICE
Filed June 19, 1923     4 Sheets-Sheet 1
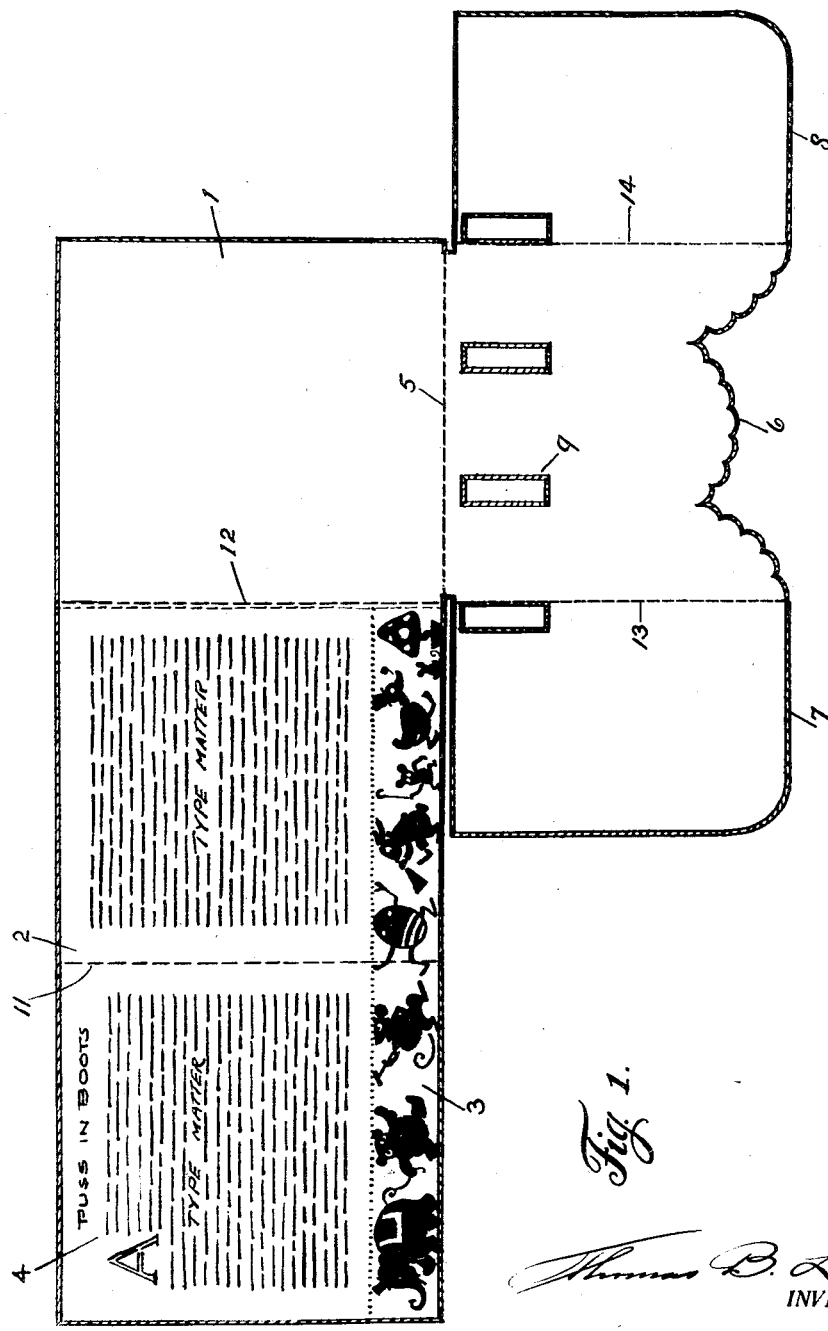

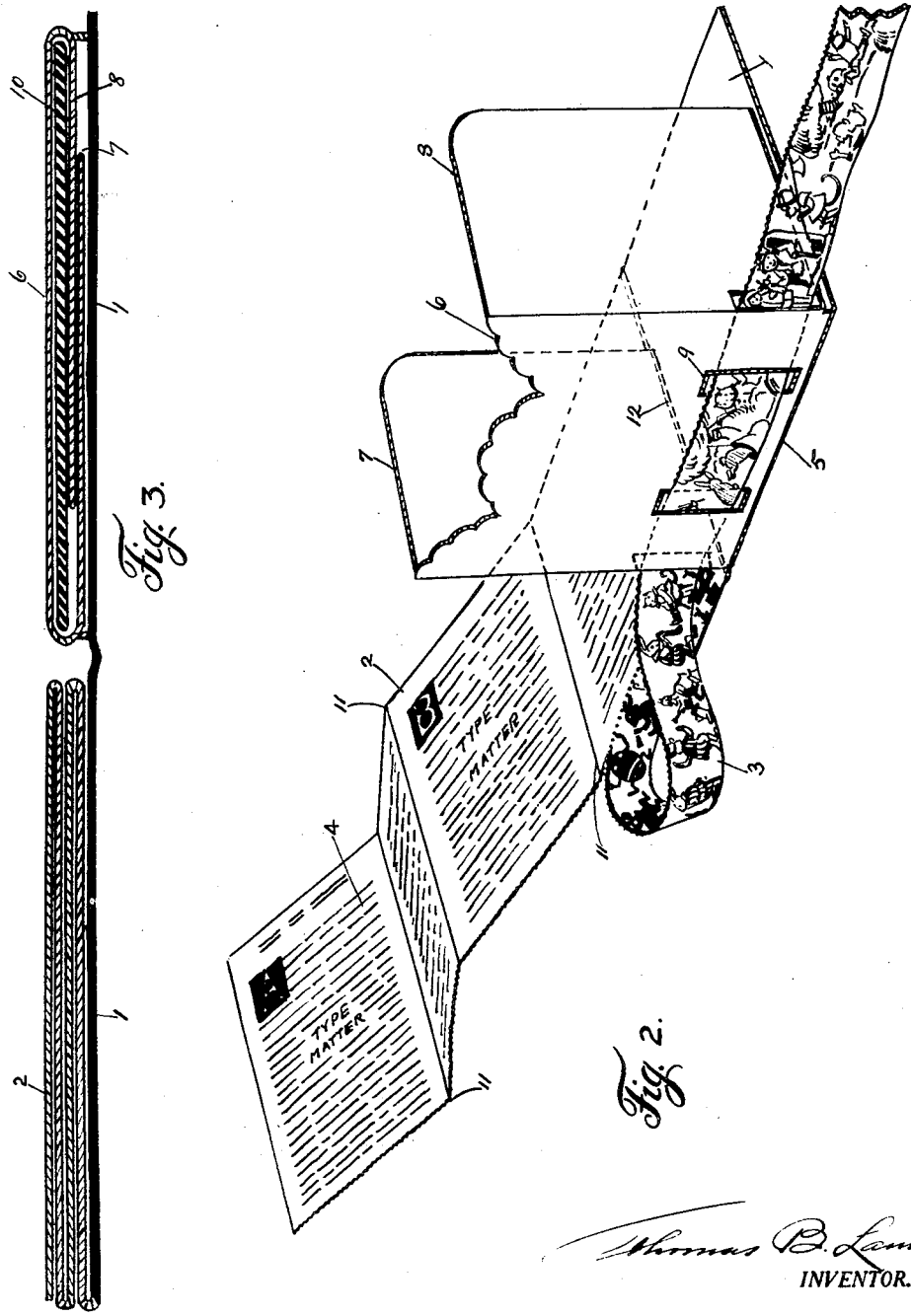

Aug. 26, 1924.　　　　　　　　　　　　　　　　　1,506,067
T. B. LAMB
ILLUSTRATED STORY DISPLAY DEVICE
Filed June 19, 1923　　　4 Sheets-Sheet 3
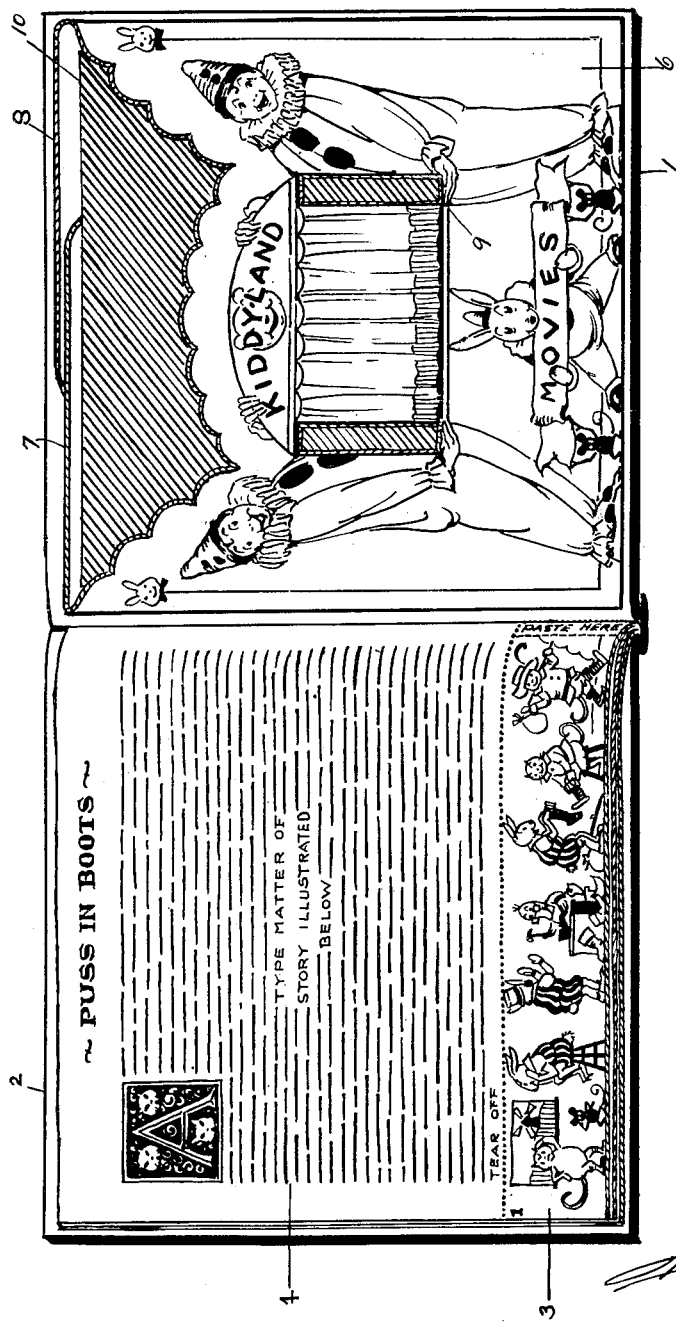
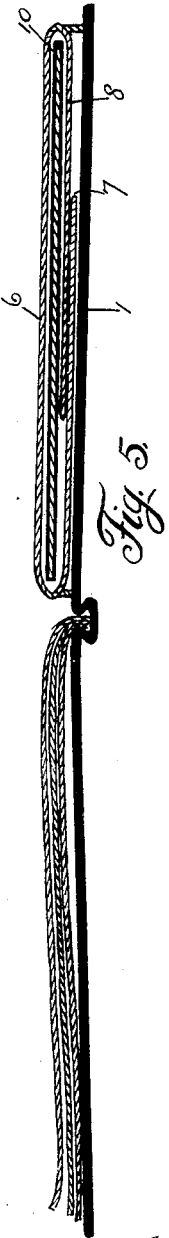
INVENTOR.
BY
ATTORNEY.

Aug. 26, 1924.
T. B. LAMB
1,506,067
ILLUSTRATED STORY DISPLAY DEVICE
Filed June 19, 1923  4 Sheets—Sheet 4
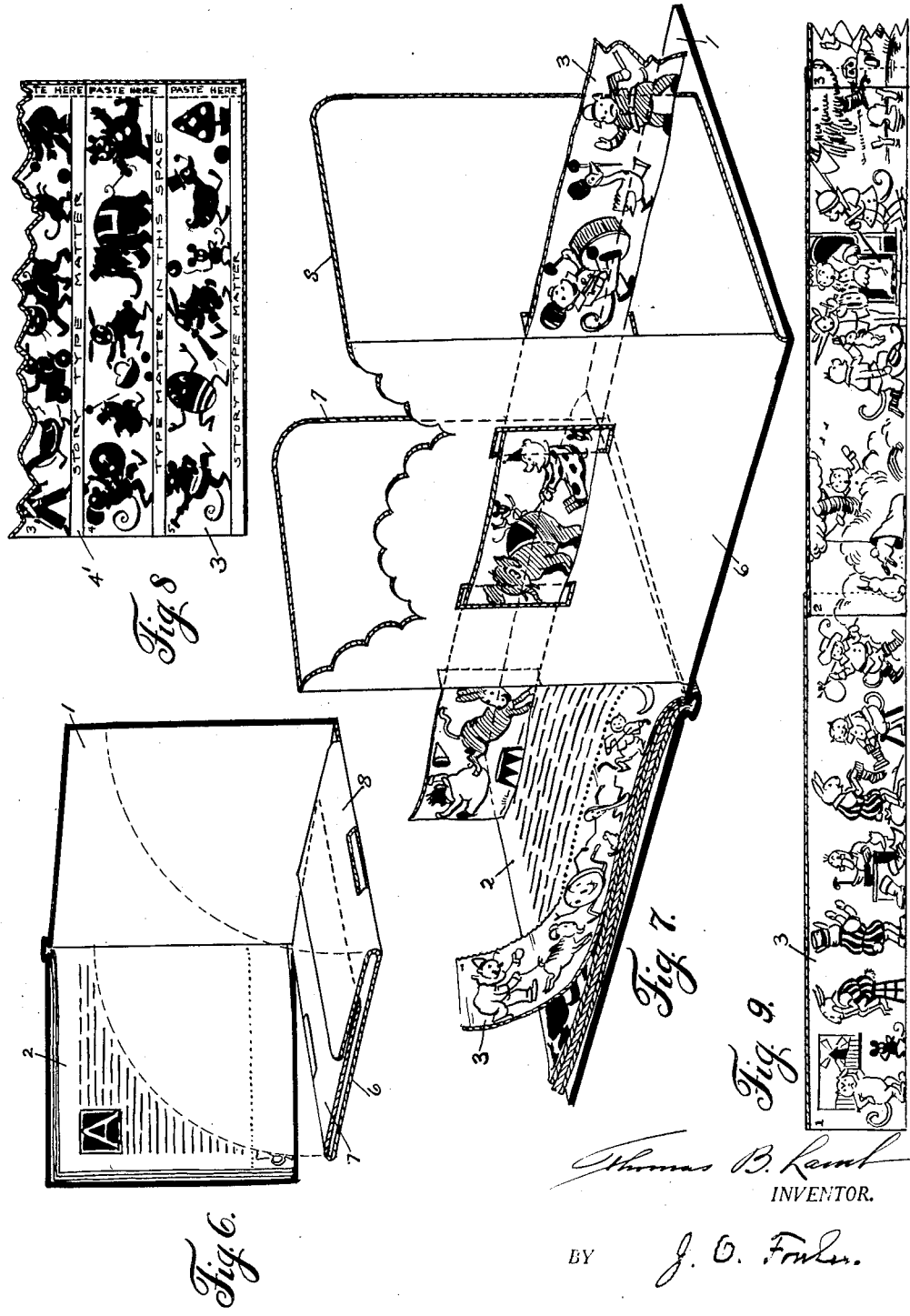

Patented Aug. 26, 1924.

1,506,067

UNITED STATES PATENT OFFICE.

THOMAS B. LAMB, OF NEW YORK, N. Y.

ILLUSTRATED-STORY-DISPLAY DEVICE.

Application filed June 19, 1923. Serial No. 646,350.

*To all whom it may concern:*

Be it known that I, THOMAS B. LAMB, a citizen of the United States, and resident of New York, in the county of New York and State of New York, have invented a certain new and useful Illustrated-Story-Display Device, of which the following is a specification, the same being a full, clear, and exact description of the invention, such as will enable others skilled in the art to which it appertains to make and use the same.

This invention relates to articles designed for presenting to view pictures of various characters preferably in connection with annexed descriptions thereof, and it comprises generally speaking of at least one sheet of suitable material having at one portion of the same a body portion and a hinged extension of the same provided with a plurality of pictures depicted thereon, said pictures preferably being adapted to be detached therefrom, the said sheets also ordinarily having imprinted thereon nursery rimes or popular tales of which the said pictures are illustrations.

Each sheet also has at another side thereof and located at a distance from the picture extension, another extension formed with at least one opening or aperture at which the pictures may be exhibited seriatum at will, the last named extension being also hinged to the body portion of the sheet and constructed so as to lie at will either parallel with or else to stand at an angle to the said body portion.

The sheet or a part of the same may be of sufficiently thick or stiff material to enable the said body portion to serve as a cover to which the said apertured extension may be attached in such a manner that when the side flaps with which it is provided are folded under the said extension, per se, a pocket may be formed in which the torn off pictures or other articles may be kept, the said pocket being thus folded in a flat relation against the body portion of the sheet, and in fact the whole device may be compactly folded together for storage or transportation purposes.

With the above named objects of the invention, and other objects and purposes hereinafter described, in view, the invention consists in the construction, arrangement, combination and operation of parts set forth below, the whole comprising a device simple in construction, inexpensive to manufacture and amusing and instructive as well as efficient in practical use.

In the drawings, illustrative of one embodiment of the invention, which accompany and form a part of this specification Figure 1 represents a plan view of the invention, the parts being shown in a flat relation;

Figure 2 is a perspective view of the device when in an unfolded position;

Figure 3 is a sectional view of the parts when assembled;

Figure 4 is an elevation of the invention showing the two folded sides thereof;

Figure 5 is a longitudinal section of the latter;

Figure 6 is a perspective view illustrating the formation of the pocket;

Figure 7 is a perspective view showing one picture strip being exhibited and another picture strip being detached;

Figure 8 is a plan view of massed pictures; and

Figure 9 is a plan view of a plurality of picture strips attached together.

Referring more in detail to the drawings, in Figure 1 the reference numeral 1 denotes the body portion of my device comprising a sheet lying in a flat relation, the same having an extension 2, hinged to one side thereof at 12, on which is depicted a number of pictures or designs and which also displays reading matter explanatory of the said pictures as indicated at 4. This extension may also be folded on the line 11 thus comprising a dual or plural conformation.

To another side of the body portion 1, as at 5, is hinged another extension 6 having side flaps 7 and 8 hinged to the same at 13 and 14, the extension proper being apertured as at 9 which parts may be folded together on the lines 5, 11 and 12. In Figures 2 and 7 the extension 6 and side flaps are shown as unfolded so as to stand at a right angle to the body portion 1.

The extension 6 and side flaps 7 and 8 when folded together as shown in Figures 4 and 5 serve to provide a pocket—the operation of the parts being indicated in Figure 6—in order to contain and form a receptacle for either picture strips or any article 10 that may be desired, as shown in Figures 3 and 9. If preferred the pictures may be massed together as illustrated in Figure 8, in which case an explanatory legend 4' is ordinarily inserted directly below each row of the same.

The extension 2 may consist of a plurality of pages folded together as illustrated in Figures 2 and 3, or the inner edges of the same may be attached together similar to the leaves of a book as shown in Figure 7, in either case each page or part of said extension may display on one or both sides thereof a plurality of pictures and explanatory matter thereof. In such instances of the embodiment of the invention the body portion 1 may serve as a cover for the folded extensions.

If desired, the strips of pictures may be detached from the pages containing the explanatory matter and the ends of the said strips pasted together so as to form a long strip as indicated in Figure 9.

I wish it to be understood that I do not desire to be limited to the particular use or the exact details of construction shown and described, for obvious modifications will occur to persons skilled in the art.

What I claim as my invention is:—

1. In a device of the class described, a sheet of material comprising a body portion having an extension comprising a plurality of pages hinged to one side of the same, said extension having a plurality of pictures depicted thereon together with explanatory matter thereof, said body portion also having hinged to another side of the same another extension apertured to permit said pictures to be shown thereat, the last named extension having flaps hinged to the same.

2. In a device of the class described, a sheet of material comprising a body portion having an extension hinged to one side of the same, said extension having a plurality of pictures depicted thereon together with explanatory matter thereof, said body portion also having hinged to another side of the same another extension apertured to permit said pictures to be shown thereat at will, the last named extension having flaps hinged to the same, both of said extensions being adapted to be folded over the said body portion.

3. In a device of the class described, a sheet of material comprising a body portion having an extension hinged to one side of the same, said extension having a plurality of pictures depicted thereon together with explanatory matter thereof, said body portion also having hinged to another side of the same another extension apertured to permit said pictures to be shown thereat at will, the last named extension having flaps hinged to the same, both of said extensions being adapted to be folded over the said body portion, the apertured extension and side flaps when folded serving to form a pocket.

4. In a device of the class described, a sheet of material comprising a body portion and an extension thereof having depicted thereon pictures and explanatory matter thereof, and another extension apertured to permit the pictures to be shown thereat at will, the whole being adapted to be folded in parallel relation, the apertured extension having flaps whereby the same may stand at an angle to the body portion when unfolded.

5. In a device of the class described, a sheet of material comprising a body portion and an extension thereof having depicted thereon pictures and explanatory matter thereof, and another extension apertured to permit the pictures to be shown thereat at will, the whole being adapted to be folded in parallel relation, the apertured extension having flaps whereby the same may stand at an angle to the body portion when unfolded, and when folded together to form a pocket.

6. In a device of the class described, a sheet of material comprising a body portion having an extension hinged to one side of the same, said extension having a plurality of pictures depicted thereon together with explanatory matter thereof, said body portion also having hinged to another side of the same another extension apertured to permit said pictures to be shown thereat at will, the last named extension having flaps hinged to the same, both of said extensions being adapted to be folded over the said body portion, the latter being in such case adapted to serve as a cover.

Signed at New York, in the county of New York and State of New York this 8th day of June, A. D. 1923.

THOMAS B. LAMB.